(12) United States Patent
Åström et al.

(10) Patent No.: US 9,668,242 B2
(45) Date of Patent: May 30, 2017

(54) HANDLING DATA IN A COMMUNICATIONS NETWORK

(71) Applicant: TELEFONAKTIEBOLAGET L M ERICSSON (PUBL), Stockholm (SE)

(72) Inventors: Bo Åström, Stockholm (SE); Tomas Nylander, Värmdö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 50 days.

(21) Appl. No.: 14/437,525

(22) PCT Filed: Oct. 25, 2012

(86) PCT No.: PCT/EP2012/071119
§ 371 (c)(1),
(2) Date: Apr. 22, 2015

(87) PCT Pub. No.: WO2014/063733
PCT Pub. Date: May 1, 2014

(65) Prior Publication Data
US 2015/0289233 A1 Oct. 8, 2015

(51) Int. Cl.
*H04W 4/00* (2009.01)
*H04W 72/04* (2009.01)
*H04L 12/26* (2006.01)
*H04L 29/08* (2006.01)
*H04W 52/02* (2009.01)

(52) U.S. Cl.
CPC ............. *H04W 72/04* (2013.01); *H04L 43/06* (2013.01); *H04L 67/32* (2013.01); *H04W 52/0258* (2013.01)

(58) Field of Classification Search
CPC .... H04L 43/06; H04L 67/32; H04W 52/0258; H04W 72/04; H04W 72/048
See application file for complete search history.

(56) References Cited

U.S. PATENT DOCUMENTS

| | | | |
|---|---|---|---|
| 2003/0142643 A1* | 7/2003 | Yang | H04W 28/06 370/328 |
| 2008/0291923 A1 | 11/2008 | Back | |
| 2010/0216484 A1* | 8/2010 | Zhou | H04W 72/04 455/450 |

(Continued)

FOREIGN PATENT DOCUMENTS

WO 2010/023646 A2 3/2010

OTHER PUBLICATIONS

Miller, et al., "Mobile Video Delivery Using Network Aware Transcoding in an LTE Network," Bell Labs Technical Journal, vol. 16, No. 4, Mar. 1, 2012.

(Continued)

*Primary Examiner* — Kan Yuen
(74) *Attorney, Agent, or Firm* — Patent Portfolio Builders, PLLC

(57) ABSTRACT

A method and apparatus for sending Network Aware data between a node in a radio network and a node in a service network. A first node generates a Protocol Data Unit, the Protocol Data Unit comprising Network Aware data. The Protocol Data Unit is then sent towards a second node using a transport bearer. This has the advantage that the second node is made aware of the Network Aware data and can, if necessary, adjust its behavior accordingly.

13 Claims, 15 Drawing Sheets

(56) References Cited

U.S. PATENT DOCUMENTS

2011/0080886 A1    4/2011   Chandrachood
2012/0120831 A1*  5/2012   Gonsa ................ H04W 76/025
                                                                    370/252

OTHER PUBLICATIONS

Atis, "Network Optimization Focus Group (NetOp-FG) Assessment and Recommendations," 3GPP Draft, 3rd Generation Partnership Project (3GPP), Mobile Competence Centre; 650, Route des Lucioles; F-06921 Sophia-Antipolis Cedex, France, Nov. 8, 2011.
Kutscher, et al., "Mobile Communication Congestion Exposure Scenario; draft-kutscher-conex-mobile-03.txt," IETF, Standardworkingdraft, Internet Society (ISOC), 4, Rue des FAlaises Ch-1205 Geneva, Switzerland, Mar. 12, 2012.
3GPP TS 23.203, 3rd Generation Partnership Project, Technical Specification Group Services and System Aspects; Policy and charging control architecture (Release 11), Mobile Competence Centre; 650, Route des Lucioles; F-06921 Sophia-Antipolis Cedex, France, Sep. 11, 2012.
EP Office Action in application No. 12780708.9 mailed Oct. 5, 2016, 5 pages.

* cited by examiner

HANDLING DATA IN A COMMUNICATIONS NETWORK

This application is a 371 of PCT/EP2012/071119, filed Oct. 25, 2012, the disclosure of which is fully incorporated herein by reference.

TECHNICAL FIELD

The present invention relates to the field of handling data in a communications network.

BACKGROUND

A mobile network is typically divided into different domains as illustrated below in simplified FIG. 1 showing an exemplary communications network. The exemplary communications network includes a radio network 1, a mobile core network 2 and a service network 3 that includes various nodes and applications. Note that the terms radio network and radio access network (RAN) refer to the same network in this description.

The radio network 1 includes ways for a user device to access the communications network, and can include any of a NodeB 4 that attached to a Radio Network Controller (RNC) 5, an eNodeB (evolved Node B) 6, and a WiFi Access Point (AP) 7 that attaches to a WiFi Access Controller 8.

The mobile core network 2 includes mobile core nodes that link the radio network 1 to the service network 3. Examples of such nodes include a Serving Gateway (SGW), Packet Data Network Gateway (PDN Gateway or PGW) and so on.

The service network 3 includes nodes such as servers that provide services to the user device. In this example, a cache server 10, a video server 11, an analytics server 12 and a further server 13 are shown but it will be appreciated that many different types and combinations of servers can be used in the service network 3.

The functionality located in the service network 3 is typically centralized to a few sites and realized without any explicit information exchange and control signalling interaction with the radio network 1. In FIG. 1, only mobile core nodes where user plane traffic is handled are shown, i.e. SGW/PDN GW (or, alternatively, GGSN, Gateway GPRS (General Packet Radio Service) Support Node, in a WCDMA (Wideband Code Division Multiple Access) network) 9. Between the radio network 1 and the SGW/PDN GW (/GGSN) 9, the GTP-U protocol (GPRS Tunnelling Protocol User Plane) is used. Between the SGW/PDN GW (/GGSN) 9 and the service network 3, the Gi interface (i.e. a normal IP network) is used.

There is a current desire in the telecommunications industry to more closely link radio network and service network functionality together in order to optimize service delivery and radio resource usage. For example, data packets sent from the service network 3 could be delayed if the service network 3 it is aware that the radio network 1 is currently congested and experiencing delays. Access specific information (radio awareness) is therefore useful for the service network 3. It is also possible that the radio network 1 can make use of information relating to the service network 3.

There is also a desire to localize and distribute service network functionality further out in the radio network 1 to save transport resources and to optimize delivery times by providing services from locations closer to the user device.

The requirement and uses for access specific information (radio awareness) in the mobile core network 2 and service network 3 are constantly increasing due to new emerging use cases such as optimized cache play-out, context based service tailoring (e.g. location, radio access technology used), and user and network analytics. Furthermore, the radio network can use information about the services in order to optimize the delivery and resource usage in the radio. These use cases and functions therefore require some sort of information exchange and control signalling interaction between the service network 3 and the radio network 1 (e.g. RNC 5, eNB 6, WiFi access controller 8). Functions operating on the user plane also require access to the user plane flow.

The option to extract application specific information from data packet flows by means of packet inspection, and to apply subscriber specific policies, is specified in 3GPP (Third Generation Partnership Project) Release 6. It is termed Flow Based Charging (FBC), and later evolved into the 3GPP Policy and Charging Control (PCC) architecture. The initial driver for PCC was to enable differentiated charging, QoS treatment of packet flows and mapping of services to bearers with different QoS. However to optimize the use cases/features discussed above, additional information exchange and explicit control signalling is required between the domains 1, 2, 3.

A problem with existing communications networks is that some data is not available to all functional entities that could potentially use it to optimize service behaviour, radio resource usage and so on.

SUMMARY

It is an object of the invention to provide a mechanism by which Network Aware data can be provided to all nodes in a communications network that require such data. According to a first aspect, there is provided a method of sending Network Aware data between a node in a radio network and a node in a service network. A first node generates a Protocol Data Unit, the Protocol Data Unit comprising Network Aware data. The Protocol Data Unit is then sent towards a second node using a transport bearer. This has the advantage that the second node is made aware of the Network Aware data and can, if necessary, adjust its behaviour accordingly.

As an option, the first node is in the radio network and the second node is in the service network. In this case, the Network Aware data may be used, for example, to inform the node in the service network of conditions in the radio network, The Protocol Data Unit is optionally sent inside a General Packet Radio Service Tunnelling Protocol frame. Furthermore, the Protocol Data Unit is optionally sent inside User traffic, the User traffic being sent inside a General Packet Radio Service Tunnelling Protocol frame.

As an alternative option, the Protocol Data Unit is sent in a header extension of a General Packet Radio Service Tunnelling Protocol frame.

As an option, the first node is in the service network and the second node is in the radio network.

As an option, the Protocol Data Unit is sent in a message according to a dedicated Network Aware protocol.

According to a second aspect, there is provided a node for sending Network Aware data between a node in a radio network and a node in a service network. The node is provided with a processor arranged to generate a Protocol Data Unit, the Protocol Data Unit comprising Network Aware data. A transmitter is provided for sending the Protocol Data Unit towards a second node using a transport bearer.

As an option, the node is arranged to be located in the radio network, wherein the transmitter is arranged to send the Protocol Data Unit inside a General Packet Radio Service Tunnelling Protocol frame. As a further option, the transmitter is arranged to send the Protocol Data Unit inside User traffic, the User traffic being sent inside a General Packet Radio Service Tunnelling Protocol frame.

As an alternative option, the transmitter is arranged to send the Protocol Data Unit in a header extension of a General Packet Radio Service Tunnelling Protocol frame.

As a further alternative option, the transmitter is arranged to send the Protocol Data Unit in a message according to a dedicated Network Aware protocol.

According to a third aspect, there is provided a gateway node for use in a mobile core network disposed between a radio network and a service network. The gateway node is provided with a receiver for receiving from a first node a message, the message comprising a Protocol Data Unit, the Protocol Data Unit comprising Network Aware data and being carried using a first transport bearer. A processor is provided for inserting the Protocol Data Unit into a second transport bearer, the second transport bearer being of a different type to the first transport bearer. A transmitter is also provided for sending the Protocol Data Unit towards a second node.

As an option, the message comprises a General Packet Radio Service Tunnelling Protocol frame, and the Protocol Data Unit is stored in any of a body of the frame and a header extension of the frame.

According to a fourth aspect, there is provided a computer program, comprising computer readable code means which, when run from a computer readable medium in the form of a memory in a processor in a node, causes the node to perform a method as described above in the first aspect.

According to a fifth aspect, there is provided a computer program, comprising computer readable code means which, when run from a computer readable medium in the form of a memory in a processor in a gateway node, causes the gateway node to behave as a gateway node as described above in the third aspect.

According to a sixth aspect, there is provided a computer program product comprising a computer readable medium and a computer program as described in either of the fourth or fifth aspects, wherein the computer program is stored on the computer readable medium.

DETAILED DESCRIPTION

There are described below techniques by which information currently not available to various nodes in one domain relating to conditions in another domain, can be delivered between Network Aware applications in the service network 3 and the radio network 1. The signalling procedures used to deliver this data are referred to herein as SMPF (Smart Mobile Broadband Protocol Framework).

The terms Network Aware applications and Network Aware data used herein refer to applications and data where nodes in the radio network 1 require information from the nodes in the service network 3, or nodes in the service network 3 require information from nodes in the radio network 1. For example, in regular video delivery, a streaming video server simply sends the video data towards the radio network 1 regardless of the current conditions or allocation of radio resources in the radio network 1. However, it is preferable for nodes in the radio network 1 to allocate resources and send the data in one burst when radio conditions are good. Similarly, if a large data file is to be delivered to a user, this may not be time critical. As loads fluctuate in the radio network 1, it would be better to send this at a time of low load. By nodes in each domain 1, 3 informing each other of local conditions or requirements, better resource planning can be implemented. Network Aware applications are therefore applications that include information about local conditions and requirements, and allow data to be sent accordingly. Network Aware data may be considered to be data sent between networks, that informs a node in a destination network (e.g. the service network) about conditions and/or requirements in the requesting network (e.g. the radio network). The node would otherwise handle all data requests the same, regardless of the conditions or requirements of the requesting network. For example, if the node in the destination network is a video streaming server and it receives an HTTP request for video, it currently provides the same video to the requesting network regardless of the requirements or conditions within the requesting network. If the requesting network is a radio network 1, then it can include Network Aware data such as the current conditions in the radio network. The node can therefore adjust its behaviour and, for example, provide high quality video in the event that the radio network is currently experiencing little congestion, or low quality video in the event that the radio network is currently experiencing high congestion. Similarly the radio network 1 can benefit from receiving Network Aware data regarding the service network 3. For example, if a user device moves to a specific location, this can trigger the radio network 1 to request a particular service.

Figure 1:
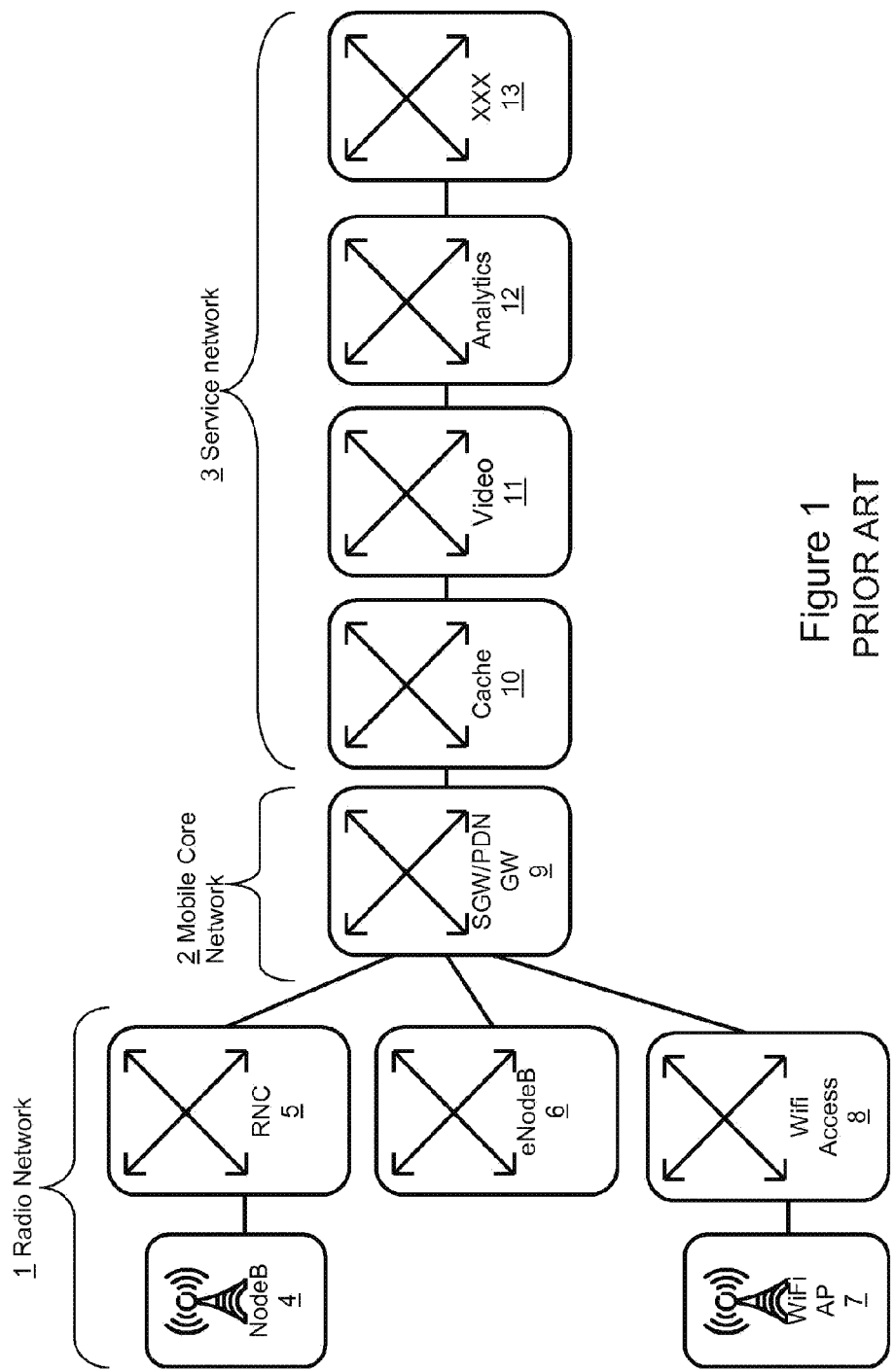
FIG. 1 illustrates schematically in a block diagram an exemplary communications network.
Figure 2:
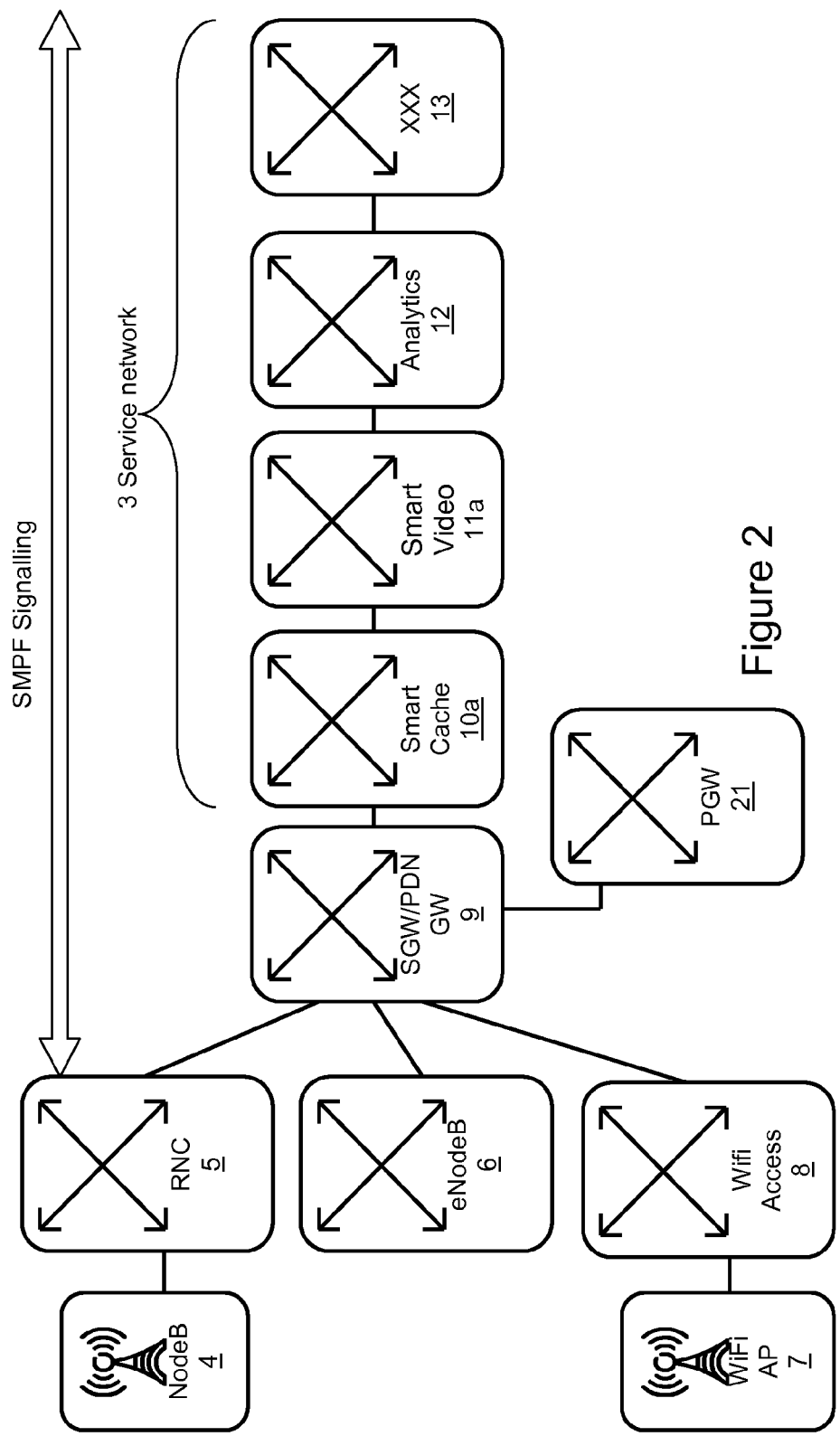
FIG. 2 illustrates schematically in a block diagram an exemplary communications network showing where SMPF signalling is required.

Referring to FIG. 2 herein, there is illustrated the exemplary network of FIG. 1 showing which nodes requires SMPF signalling. In this case, the cache 10 is replaced with a Smart cache 10*a* and the video server 11 is replaced with a Smart video server 11*a*. Both these nodes 10*a*, 11*a* can benefit from received Network Aware data, and modify their behaviour according to received Network Aware data. It can be seen that SMPF signalling must go between the radio network 1 and the service network 3 via the mobile core network 2.

To better understand the motivation for the techniques described below, it is helpful to describe some of the uses that can be made of the sort of Network Aware data to be carried between the radio network 1 and the service network 3. The sort of information that can be carried using the SMPF signalling includes:

Improved end user experience leading to increased end user loyalty and reduced churn.
  Signalling of service characteristics from the service network 3 to the radio network 1 allowing the radio network 1 to reshape the traffic to improve radio usage.
  Signalling of DPI (Deep Packet Inspection) retrieved data to Network Aware applications. Instead of performing DPI at many nodes, nodes receiving SMPF signalling can leverage information from already performed DPI activities, for tailoring of services.
  Signalling of Control Plane received information enabling nodes receiving SMPF signalling to access data they normally do not receive, obtained by other SMPF-enabled nodes from control plane signalling (e.g. location, RAT, Terminal Type, etc).
Reduced battery consumption in terminals: Network Awareness in the radio network 1 enables optimizations of radio state transitions, drastically reducing the battery consumption.
Improved market segmentation and Mobile Broadband (MBB) monetization: For example, radio resource demanding services such as video can be reserved for flows for services with paying users.
Input to network and user analytics: Customer care can be provided with a deeper understanding of how a service is behaving and why a user may have suffered performance degradation at a given time, and at the same time trigger a build out of the network in that area.

The operator can use historical and current data gathered in user activity profiles to offer new appealing services.

Figure 3:
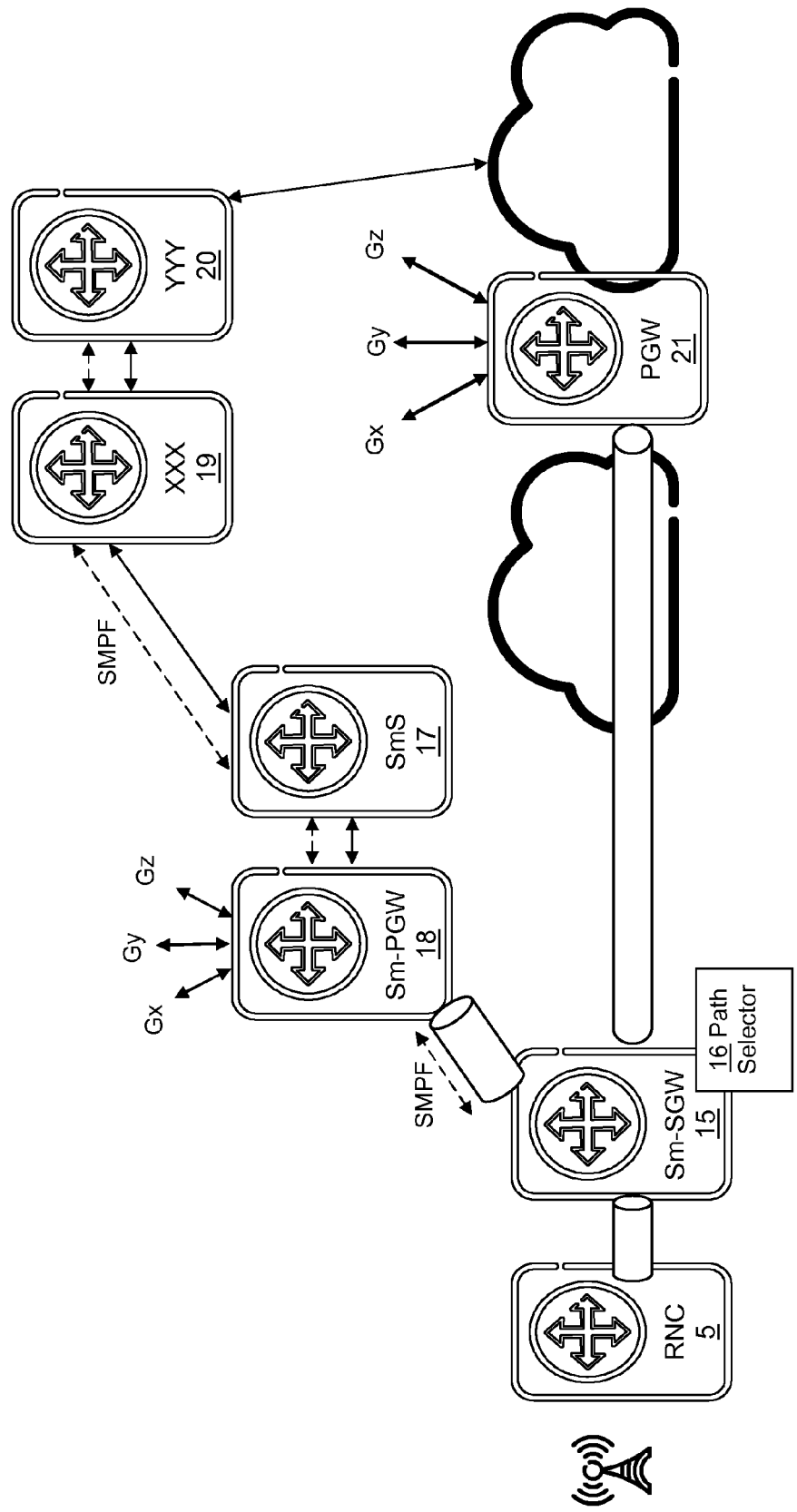
FIG. 3 illustrates schematically in a block diagram an exemplary communications network according to an embodiment of the invention.

FIG. 3 illustrates an exemplary network. A RAN entity such as an RNC node 5 (although note that this could be any suitable RAN entity, and RNC is used herein by way of example) sends signalling to the radio access domain 1 and a Smart SGW (Sm-SGW) 15. The Sm-SGW 15 hosts a Path Selector function 16 (described in more detail below) in the SGW. The Path Selector 16 determines which nodes have access to the SMPF generated signalling (the dashed arrows in FIG. 3). This is determined, for example, by Packet Inspection (PI) or Deep Packet Inspection (DPI) of the user plane traffic. An alternative way to determine this is to check for the presence of GTP-U extension headers in the event that they are being used.

Nodes with Network Aware Applications are consumers of SMPF information, and SMPF data traffic is routed to these nodes. In FIG. 3, an example of such a Network Aware application is denoted SmS (Smart Server) 17. The SMPF signalling is recognized by the Path Selector 16 and routed to the SmS 17 via a Smart PGW (Sm-PGW) 18. The SMPF signalling may be further distributed to other applications, as illustrated by nodes XXX 19 and YYY 20. Data traffic selected by the path selector 16 as being SMPF traffic passes via the Sm-PGW 18 at which charging, policy control, legal interception and so on can be applied using the standardized interfaces (Gx,Gy,Gz).

Where the Path Selector 16 determines that data traffic is not destined for a node that requires SMPF information, it is routed as normal to a regular PGW 21 for further packet processing and routing.

The Path Selector 16 provides functionality for message routing, address mapping and Protocol Data Unit (PDU) transport mapping.

Considering first message routing, the Path Selector 16 provides routing and delivery of upstream (from the radio network 1) SMPF data traffic to relevant SMPF entities in the service network 3. It also provides delivery of downstream (to the radio network 1) SMPF traffic from the mobile core network 2 and the service network 3 to a radio network entity for which SMPF signalling is taking place (e.g. user related signalling intended for the RNC 5 currently serving the user.

Figure 4:
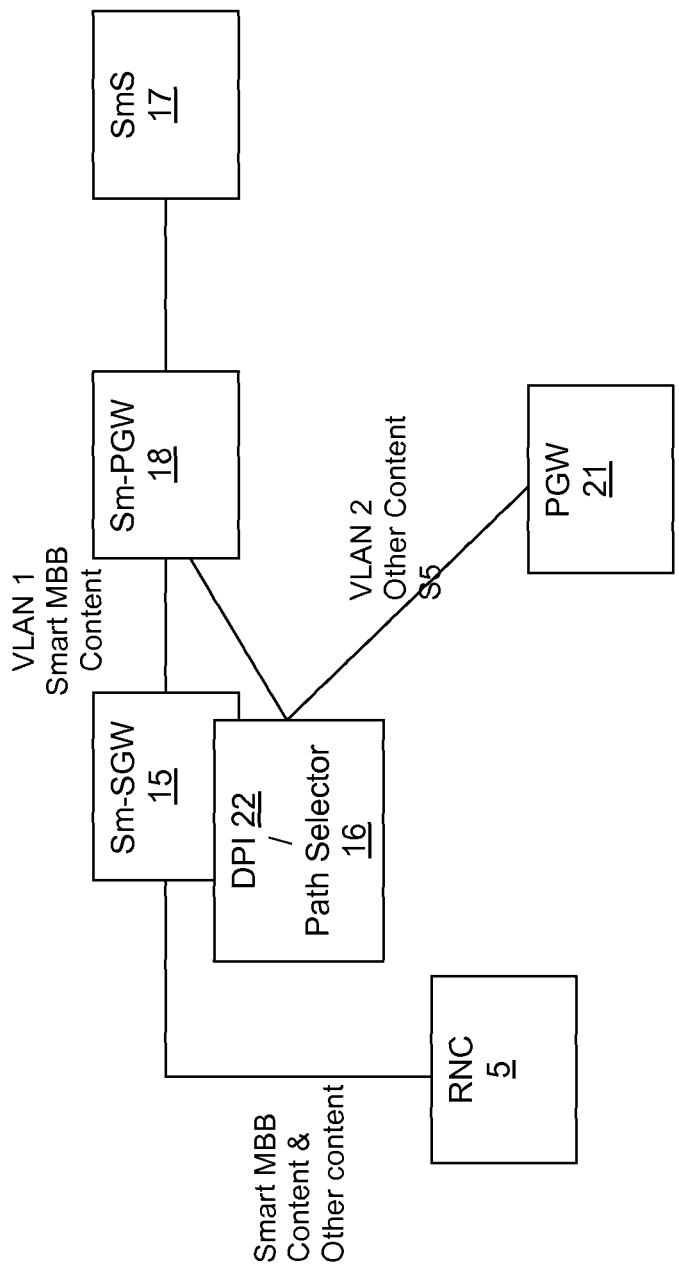
FIG. 4 illustrates schematically in a block diagram message routing in a communications network according to an embodiment of the invention.

Turning to FIG. 4, the Path Selector 16 performs message routing and allows the Sm-PGW 18 to co-exist with a Core Network resident PGW 21, i.e. to be an add-on to existing functionality for Network Aware Applications on the SMPF route. For Network Aware Applications and their services, the SMPF route and the Sm-PGW 18 is chosen as the next hop in the route. The PGW 21 is chosen as the next hop for all other applications and the services offered by these. The Sm-PGW 18 is used for Charging, Lawful Intercept (LI), and Policy handling for services and signalling on the SMPF route.

The Sm-SGW 15 is provided with a Deep Packet Inspection (DPI) function to determine whether a requested service should be served by a Network Aware node on the Network Aware path. A specific DSCP value for "Smart MBB" can be set to help a router to execute the policy based routing, and choose VLAN 1 for the Network Aware path. This assists the routing after the Sm-SGW 15 in the service network 3.

Figure 5:
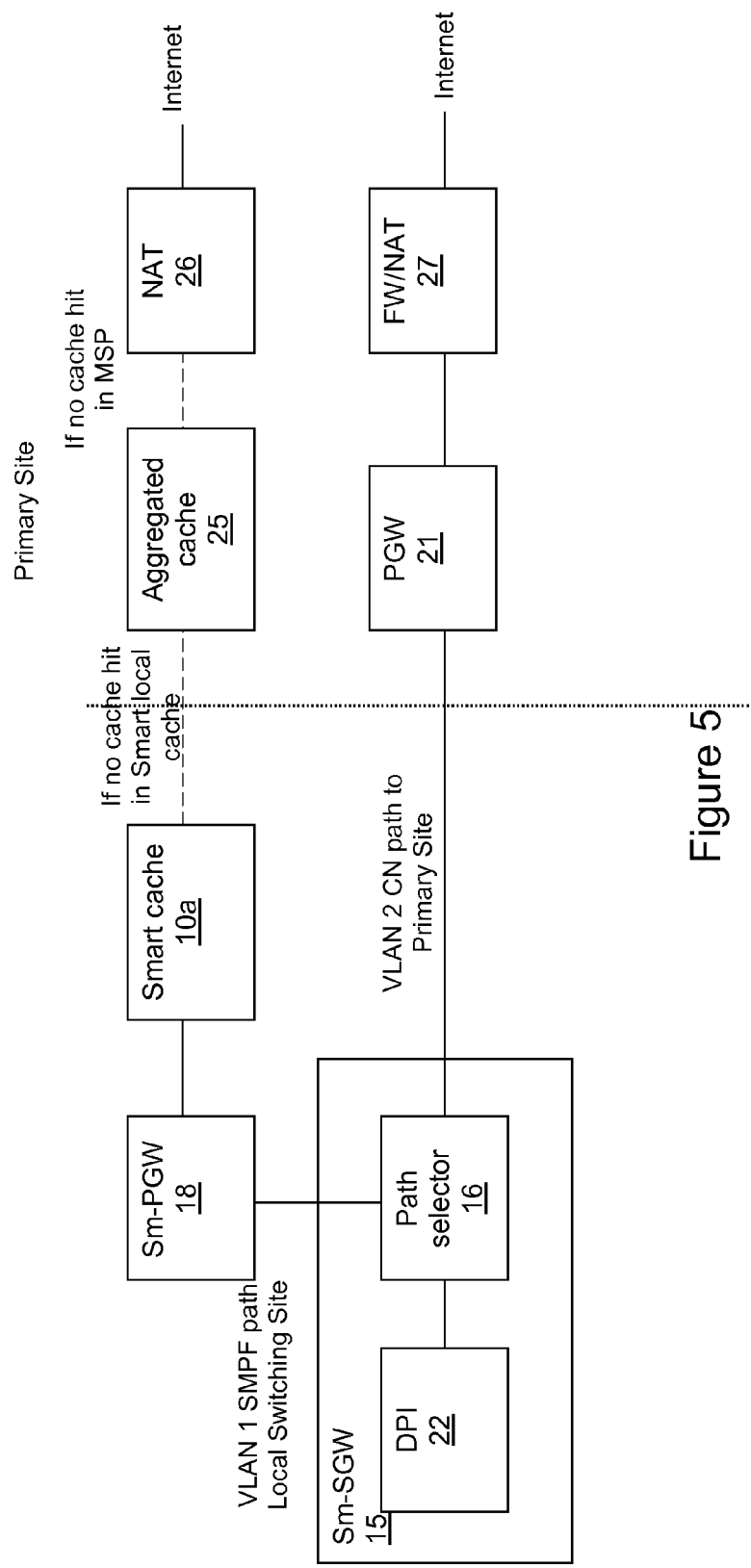
FIG. 5 illustrates schematically in a block diagram message routing using a VLAN according to an embodiment of the invention.

Turning to FIG. 5 herein, an SMPF route can be selected using a separate VLAN. If the DPI function 22 and the Path selector 16 determine that signalling should be routed to a Network Aware node, the signalling is sent to the Sm-PGW 18 and, if necessary, to a local cache 10*a*. From there, the signalling is sent to an aggregated cache 25 in the primary site and on to a NAT (Network Address Translation) function 26 before being forwarded towards, for example, a Network Aware Internet node. If signalling not is intended for a Network Aware node, it is sent to a PGW 21 and on to a NAT 27 as normal before being forwarded to the relevant nodes.

As mentioned above, the Path Selector 16 provides address mapping functionality. Address mapping is required for both upstream and downstream SMPF data traffic. Address Mapping for SMPF PDUs between the radio network 1 and the service network 3 depends on the transport protocol chosen for SMPF. Address mapping is therefore performed by the Path Selector 16 in the mobile core domain 2. Some aspects of the structure of the SMPF PDU and transport options are described below.

The Path Selector 16 provides SMPF PDU transport mapping between the radio network 1 (S1-UP (LTE), S12 (UMTS/3G) and S4 (GSM)) and Gi connected SMPF entities.

SMPF PDUs can be signalled as GTP-U extension headers over the established GTP-U connection either:
  together with User Plane traffic
  as an empty GTP-U message (no payload, only extension headers)
  as an echo-test message with extension headers One benefit with the first alternative (together with User Plane traffic) is that an SMPF PDU can be correlated with the actual user plane packet since the SMPF PDU and user plane packet come together to the receiving node.

Figure 6:
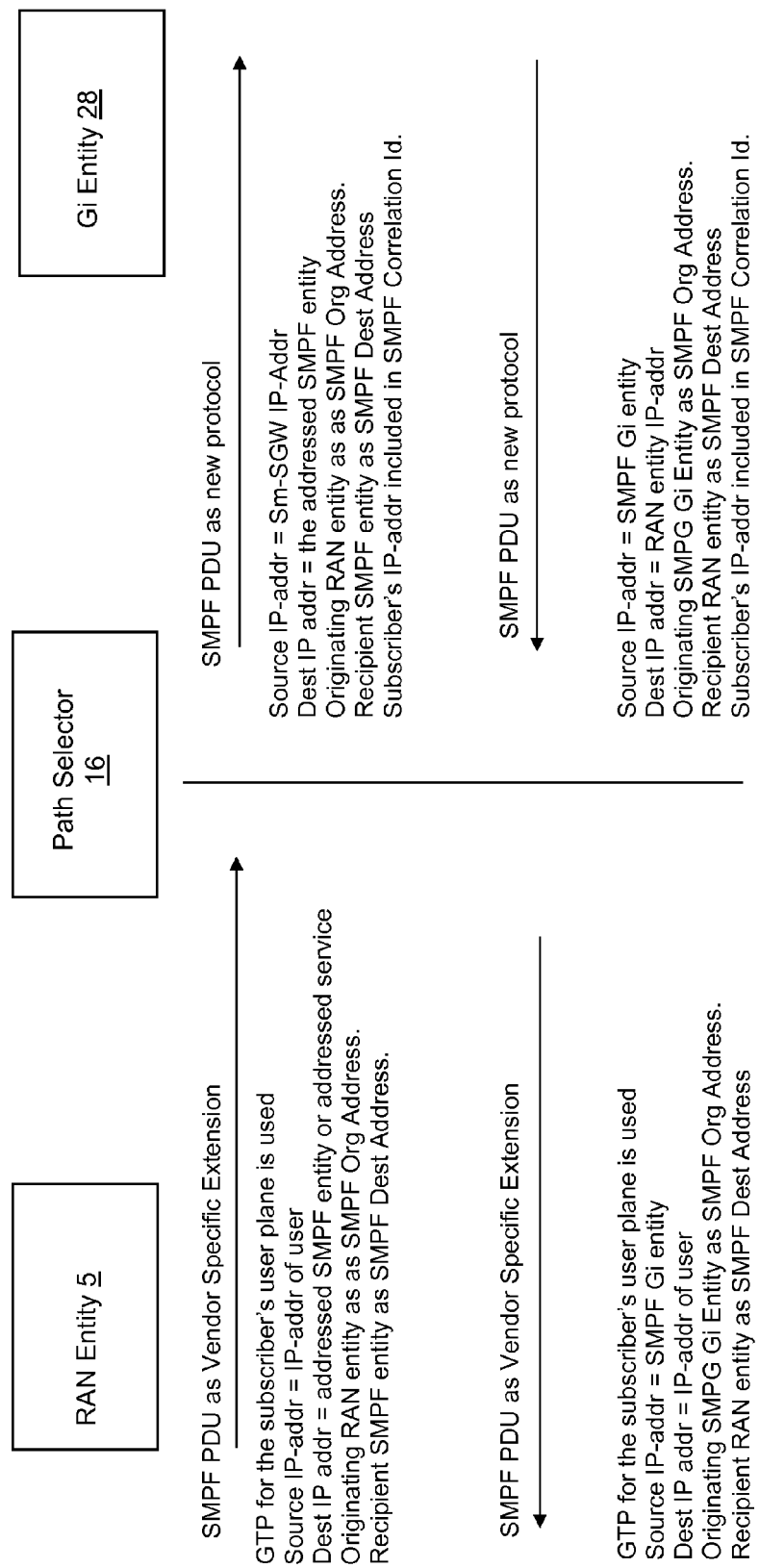
FIG. 6 illustrates Protocol Data Unit transport mapping between a radio network and a Gi entity in the service network using header extensions.

FIG. 6 illustrates address mapping at the path selector 16 between a radio network 1 entity and a Gi Entity 28 in the service network 3. This allows vendor-specific SMPF PDUs to be used on the radio network 1 side, and new SMPF protocol SMPF PDUs to be used on the service network 3 side. This allows proprietary SMPF PDUs to be used on the radio network 1 side, because an SMPF PDU can be taken as a container from the signalling coming from the radio network 1, and passed on (whole container) to the service network 3 nodes as a new protocol. This greatly simplifies mapping.

Figure 7:
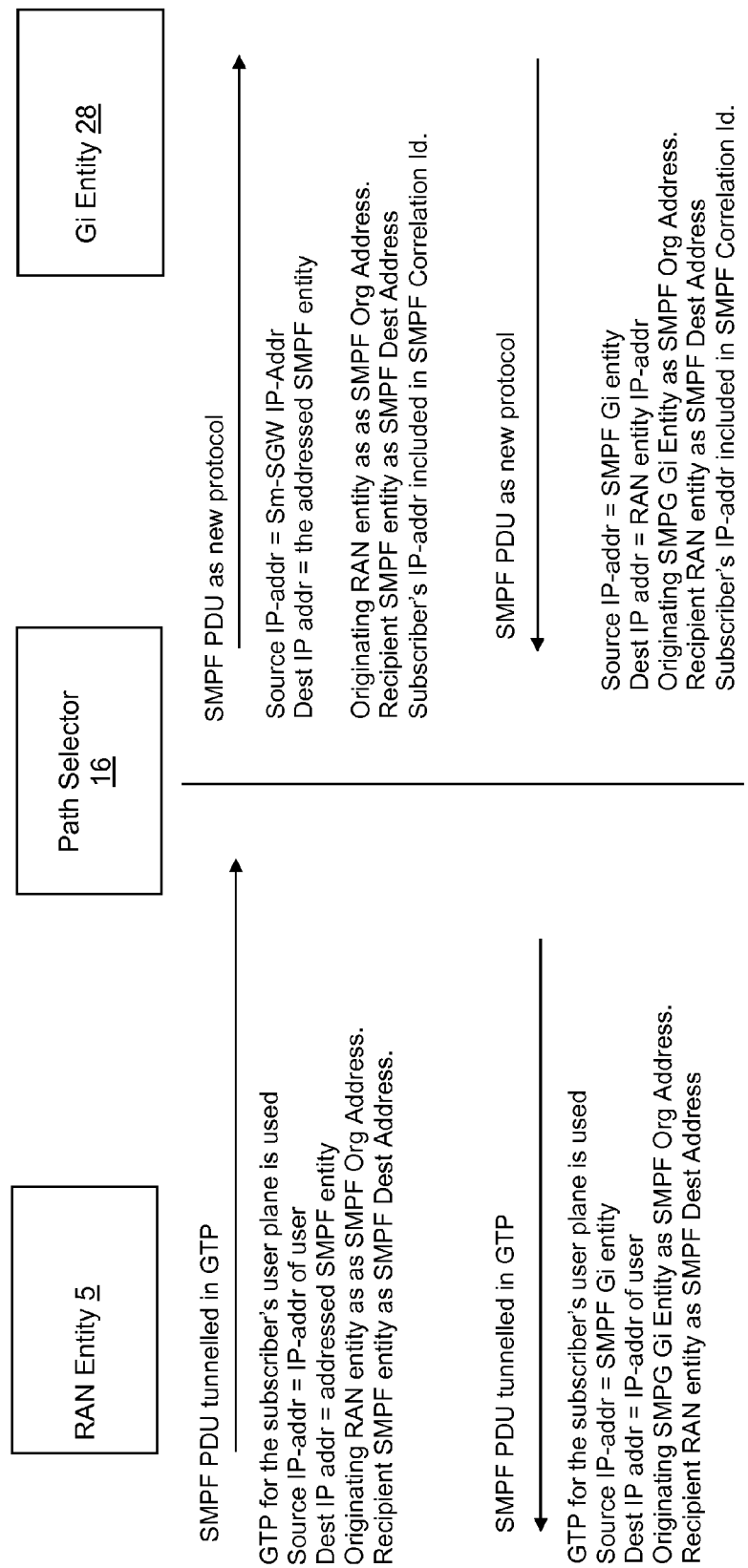
FIG. 7 illustrates Protocol Data Unit transport mapping between a radio network and a Gi entity in the service network using user plane data.

As an alternative to signalling SMPF PDUs as a GTP-U header extension, they may be signalled as user plane data. In either case, mapping is still required at the path selector 16 to a new protocol to be used on the service network 3. In this case, and referring to FIG. 7, the SMPF PDUs are signalled as User Plane data in GTP-U as a dedicated SMPF PDU GTP-U message. In this case, the PDU is tunnelled at the radio network 1 side in a GTP tunnel.

The SMPF PDU is transport-independent; in other words, the SMPF PDU can be carried over any type of transport bearer. In the upstream directions, the SMPF PDU transport options can be divided into two solutions; one before the Sm-SGW 15 (predominantly in the radio network 1) and one after the Sm-GW 15 (predominantly in the service network 3). In the radio network 1, the SMPF PDU may be transported over S1-UP (in an LTE network) or S12 (in a UMTS/3G network). In the service network 3, the SMPF PDU may be transported over a Gi interface. The transports bearers are only bearers of the SMPF PDU, and the Network Aware data is carried inside the PDU, allowing the SMPF-PDU to be transport-independent.

Figure 8:
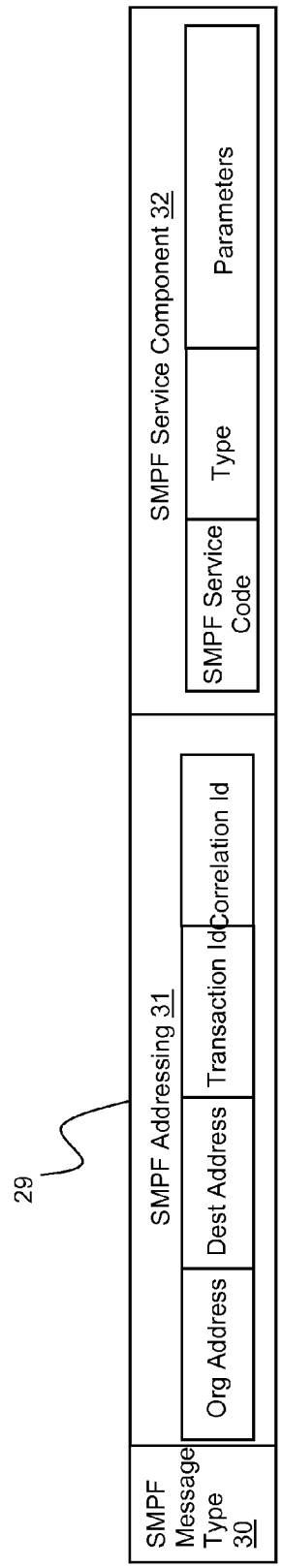
FIG. 8 illustrates schematically in a block diagram a Protocol Data Unit according to an embodiment of the invention.

Turning to FIG. 8, there is illustrated an SMPF PDU 29. The transport independent SMPF PDU contains the following information elements:

SMPF Message Type 30. Examples of an SMPF Message Type 30 include Start/Bootstrap, Transfer P2P (Point-to-Point), Transfer M2M (Many-to-Many) and Stop.

An SMPF Addressing information element 31 includes an Org Address (the originating SMPF Entity Address), a Dest Address (the destination SMPF Entity Address), a Transaction Id (a reference used to associate SMPF Service Components, such as a Result to an Offer), a Correlation Id (an optional Id that may be used to correlate SMPF signalling with other signalling, such as a tunnel ID for GTP).

An SMPF Service Component 32 includes an SMPF Service Code (an Identifier for the SMPF activity such as a User Activity Report), a Type (e.g. Offer, Result, Error) and Parameters (such as Parameters sent in Offers, Results and Errors, defined per SMPF activity).

Figure 9:
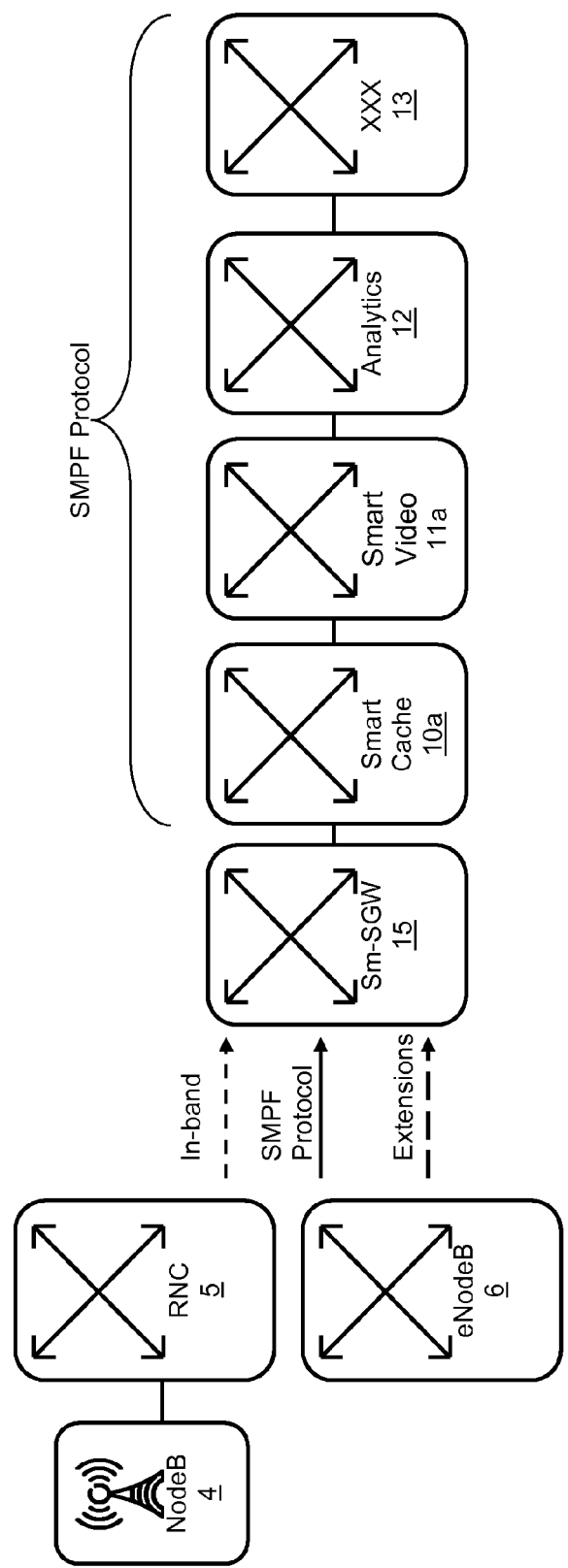
FIG. 9 illustrates schematically in a block diagram an exemplary network and transport alternatives according to embodiments of the invention.

FIG. 9 illustrates three alternatives for transport of the SMPF PDU in the radio network 1 towards the Sm-SGW 15. These three options are:

1) In-band, in which the SMPF information is carried in a GTP tunnel, tunnelled inside the User Plane to the Sm-SGW 15.

2) SMPF Protocol (out-of-band), in which the SMPF information is transported in a dedicated SMPF protocol to the Sm-SGW 15.

3) Extension Hybrid, in which the SMPF information is transferred as a GTP vendor specific extension towards the Sm-SGW 15.

For each of the three alternatives proposed above, in the service network 3, the PDU is transported using a dedicated SMPF protocol on Gi.

Figure 10:
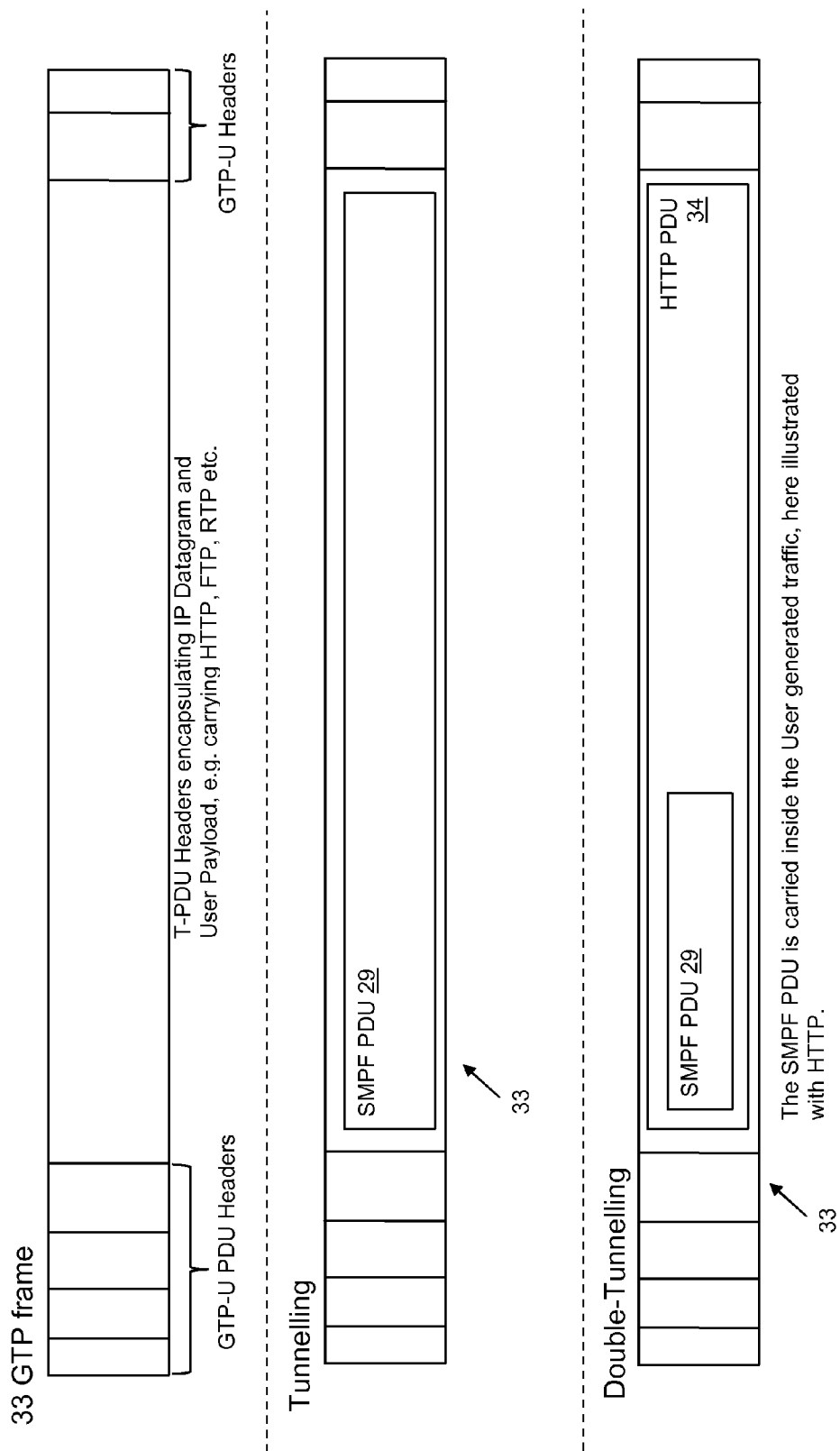
FIG. 10 illustrates schematically in a block diagram exemplary in-band transport of a Protocol Data Unit.

FIG. 10 illustrates schematically an example of in-band transport of the SMPF PDU 29. For the case of tunnelling, the SMPF PDU 29 is carried inside a GTP frame 33. SMPF signalling is sent separately in GTP frames and not together with user generated User Plane traffic. In other words, associated HTTP traffic would be sent in another GTP frame. An advantage of in-band tunnelling is that there is no impact in the radio network 1 because it uses existing transport bearers. This ensures that an SMPF PDU can pass through firewalls etc. without any modification to existing firewalls. Furthermore, the SMPF PDU is automatically correlated with the correct user because it is carried within existing userplane traffic.

In the case of double-tunnelling, the SMPF PDU 29 is carried inside the User generated traffic, illustrated in this example using an HTTP PDU frame 34. An advantage of this is that the SMPF PDU is correlated with the exact user plane packet in which it is tunnelled.

In the second alternative, a dedicated SMPF protocol is used on the radio network 1 side of the Sm-SGW 15. In this case, the protocol is identified either with a specific Protocol Id in the IP frames, or ports in UDP/TCP.

Figure 11:
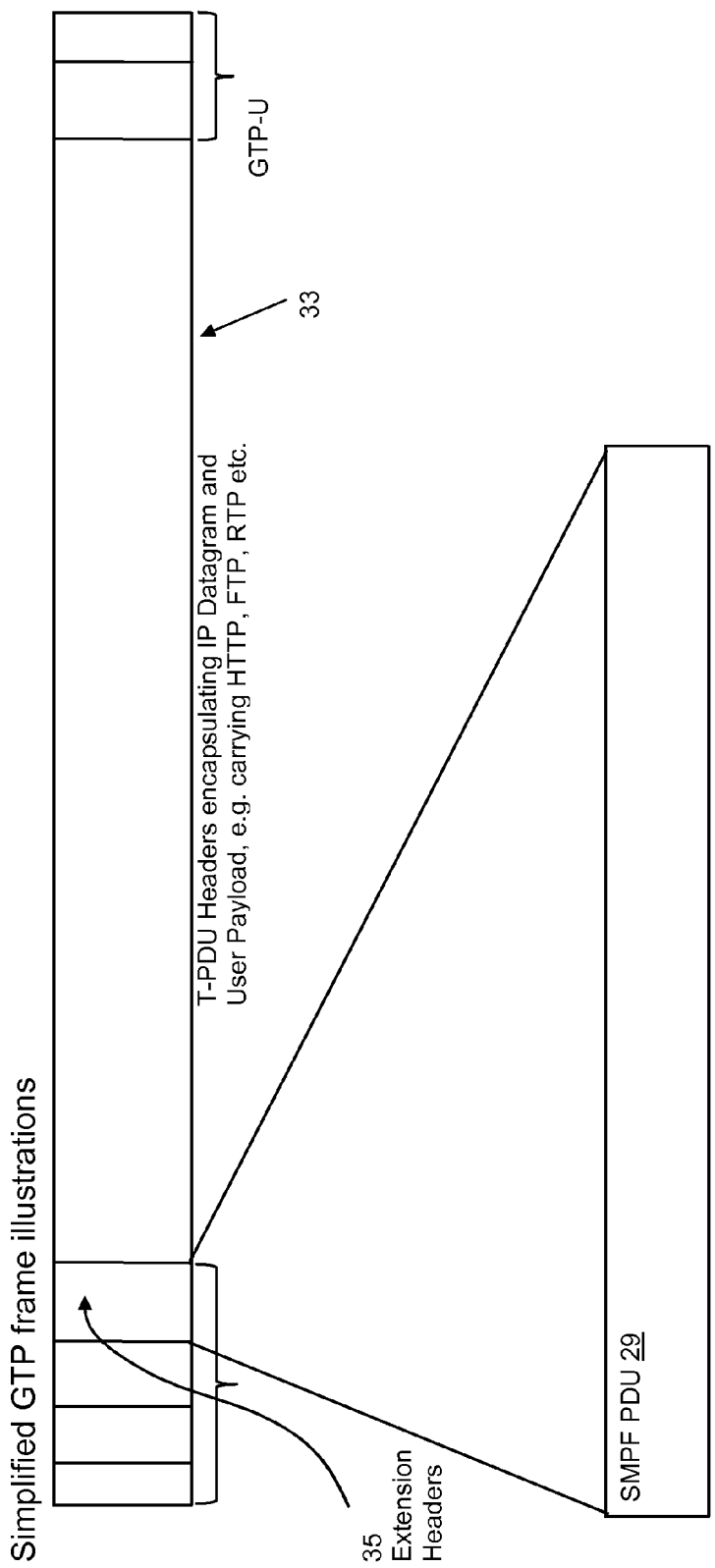
FIG. 11 illustrates schematically in a block diagram an example of a Protocol Data Unit transferred as a header extension.

In the third alternative, the SMPF PDU is transported in extension headers 35 in a GTP frame 33 for transport, as illustrated in FIG. 11.

As described above, for all three alternatives on the radio network 1 side, the SMPF PDU is transported in the service network 3 using a dedicated SMPF protocol, identified either with a specific Protocol Id in the IP frames, or ports in UDP/TCP.

Figure 12:
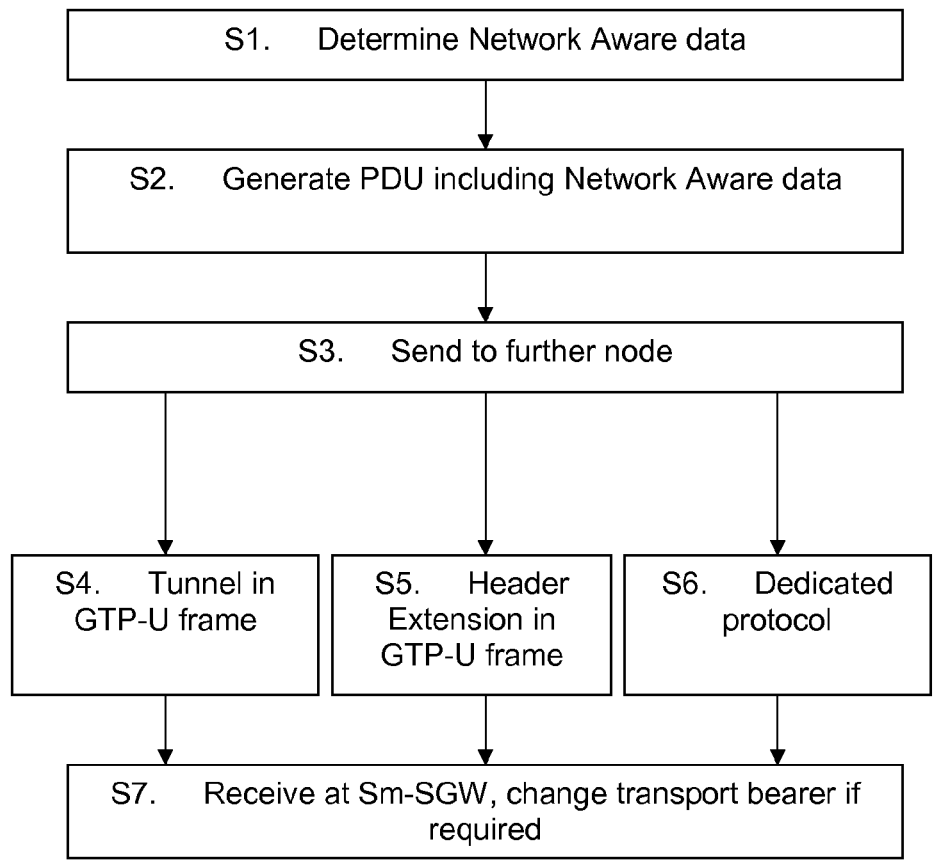
FIG. 12 is a flow diagram showing steps according to an embodiment of the invention.

FIG. 12 is a flow chart showing a high level summary of different ways of sending an SMPF PDU. The following numbering corresponds to that of FIG. 12:

S1. A sending node, for example an RNC 5 in the radio network 1, determines that it wishes to send a communication to a service node in the service network 3. It therefore determines that it has Network Aware data to send, such as conditions in the radio network 1.

S2. An SMPF PDU is generated that includes the Network Aware data.

S3. The SMPF PDU is sent towards the service network 3 using one of the methods described above, and summarized in each of steps S4, S5 and S6 below.

S4. In this embodiment, the SMPF PDU is sent using a tunnel in a GTP-U frame, as illustrated in FIG. 10.

S5. In this embodiment, the SMPF PDU is sent as a header extension in a GTP-U frame, as illustrated in FIG. 11.

S6. In this embodiment, the SMPF PDU is sent using a dedicated SMPF protocol.

S7. The SMPF PDU traverses the Sm-SGW 15 which, if necessary, changes the transport bearer and sends the SMPF PDU towards the destination service node in the service network 3 using a dedicated SMPF protocol.

Figure 13:
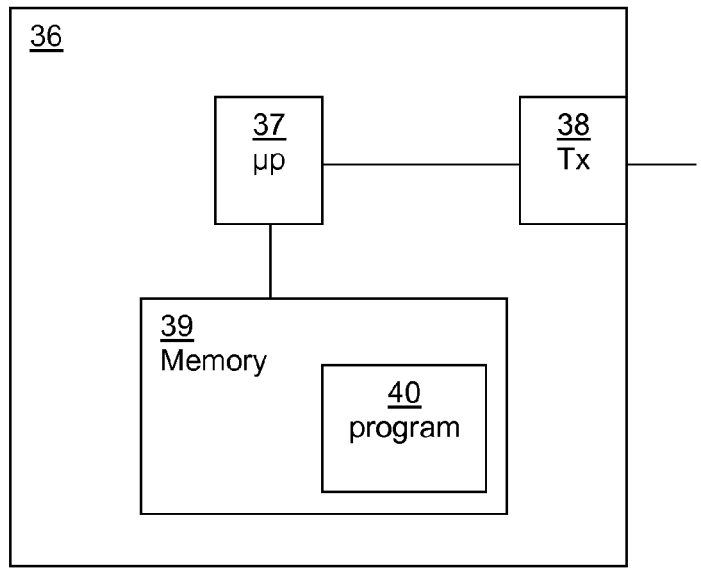
FIG. 13 illustrates schematically in a block diagram a gateway node according to an embodiment of the invention.

Turning now to FIG. 13, there is illustrated schematically a node 36 for sending an SMPF PDU 29. This may be, for example, a UE (User Equipment) or an RNC 5, or in the case where Network Aware data is sent from the service network 3 to the radio network, the node 36 may be an Application Server. The node 36 is provided with a processor 37 for determining that Network Aware data is to be sent and including the Network Aware data in an SMPF PDU 29. A transmitter 38 is provided for sending the SMPF PDU 29 towards its destination. As described above, this may be tunnelled as a GTP-U frame, as a header extension in a GTP-U frame, or using a dedicated SMPF protocol.

A computer readable medium in the form of a memory 39 is also provided. This is used for storing a computer program 40 which, when executed by the processor 37, causes the processor 37 to perform the operations described above.

Figure 14:
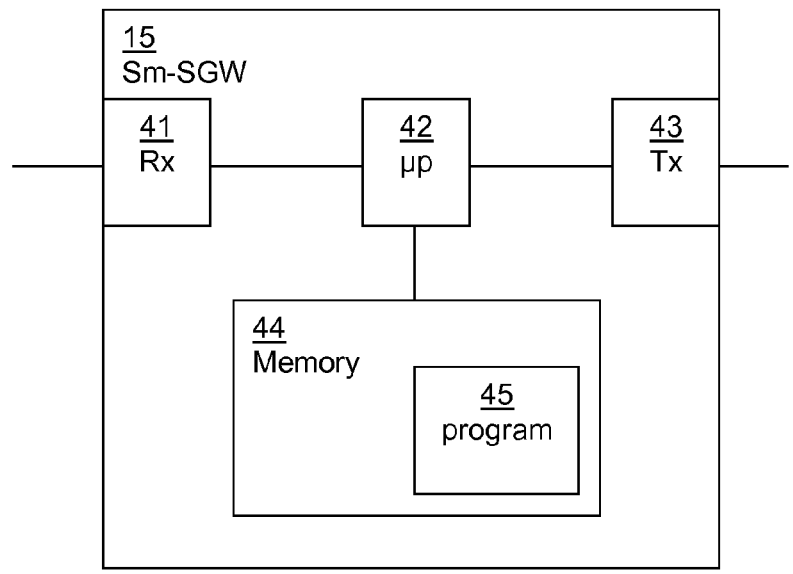
FIG. 14 illustrates schematically in a block diagram an exemplary gateway node for use in a mobile core network.

FIG. 14 illustrates schematically a gateway node such as an Sm-SGW 15. The Sm-SGW 15 is provided with a receiver 41 for receiving a message that includes an SMPF PDU 29 that contains Network Aware data. A processor 42 determines the presence of the SMPF-PDU 29 and inserts it into a second transport bearer, the second transport bearer being of a different type to the first transport bearer. A transmitter 43 is provided for sending the SMPF PDU 29 towards a second node.

A computer readable medium in the form of a memory 44 is also provided. This is used for storing a computer program 45 which, when executed by the processor 42, causes the processor 42 to perform the operations described above.

A further issue is that, in existing networks, some data is not available to all functional entities that wish to use it to optimize service behaviour. Moreover, the optimal delivery mode is dependent on the signalling procedure. Some procedures are point-to-point whereas others are of a one-to-many or many-to-many nature. In other words, the information sent by the originator may be of interest to more than one recipient. The term M2M (Many-to-Many) has been used below, and a solution for delivering SMPF information in an M2M fashion is described.

In this example, SMPF Message Type 30, as illustrated in FIG. 8, is "Transfer M2M" to show that the information sent by the originator may be consumed by many recipients. Examples of such information include a User Activity Report containing DPI retrieved (URL, requested service, etc.) information and Control Plane retrieved information (location, RAT, terminal type, etc).

Figure 15:
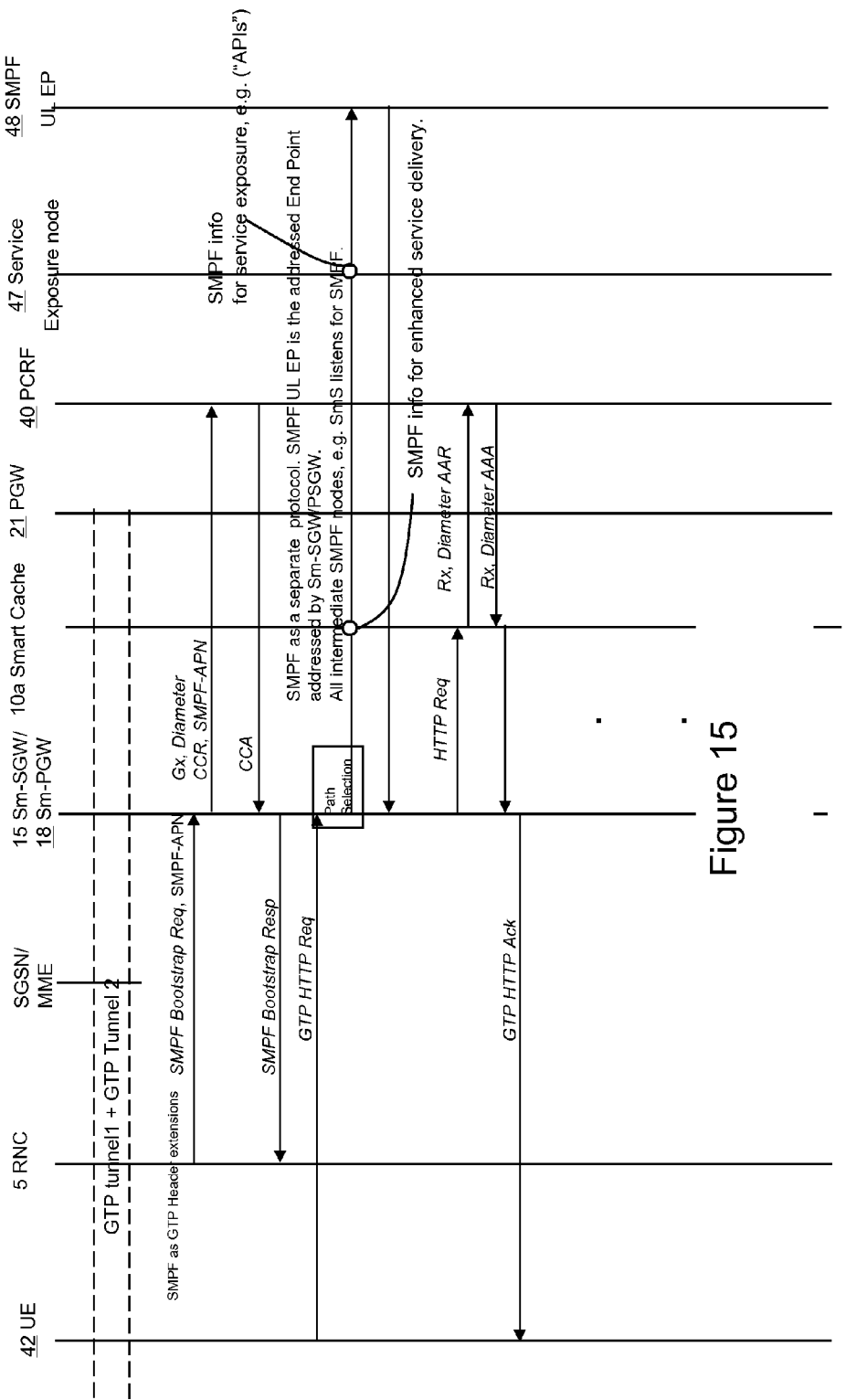
FIG. 15 is a signalling diagram showing exemplary signalling for sending SMPF signalling to a plurality of destinations.

FIG. 15 shows exemplary signalling where there are two entities who need to receive an SMPF User Activity Report; the Smart Cache 10a and a Service Exposure node 47 The Smart Cache 10a uses the User Activity report to check whether it is available in the cache (requested service) and to tailor the presentation (location, terminal type).

The Service Exposure node 47 logs the User Activity Report and publishes it to applications requesting this information, e.g. a user's current location.

Upstream SMPF M2M messages are addressed to a fictitious end-point, termed the SMPF UL-EP 48. This prevents the information in the User Activity Report from spreading to non-SMPF entities. The address of the SMPF UL-EP 48 is the ultimate destination of SMPF messages having passed all other relevant SMPF nodes on the SMPF route. However, this is just a "dummy" endpoint address to prevent the SMPF M2M messages from being forwarded to other nodes.

Downstream SMPF M2M messages are addressed to an SMPF DL-EP received in the first upstream message.

Figure 16:
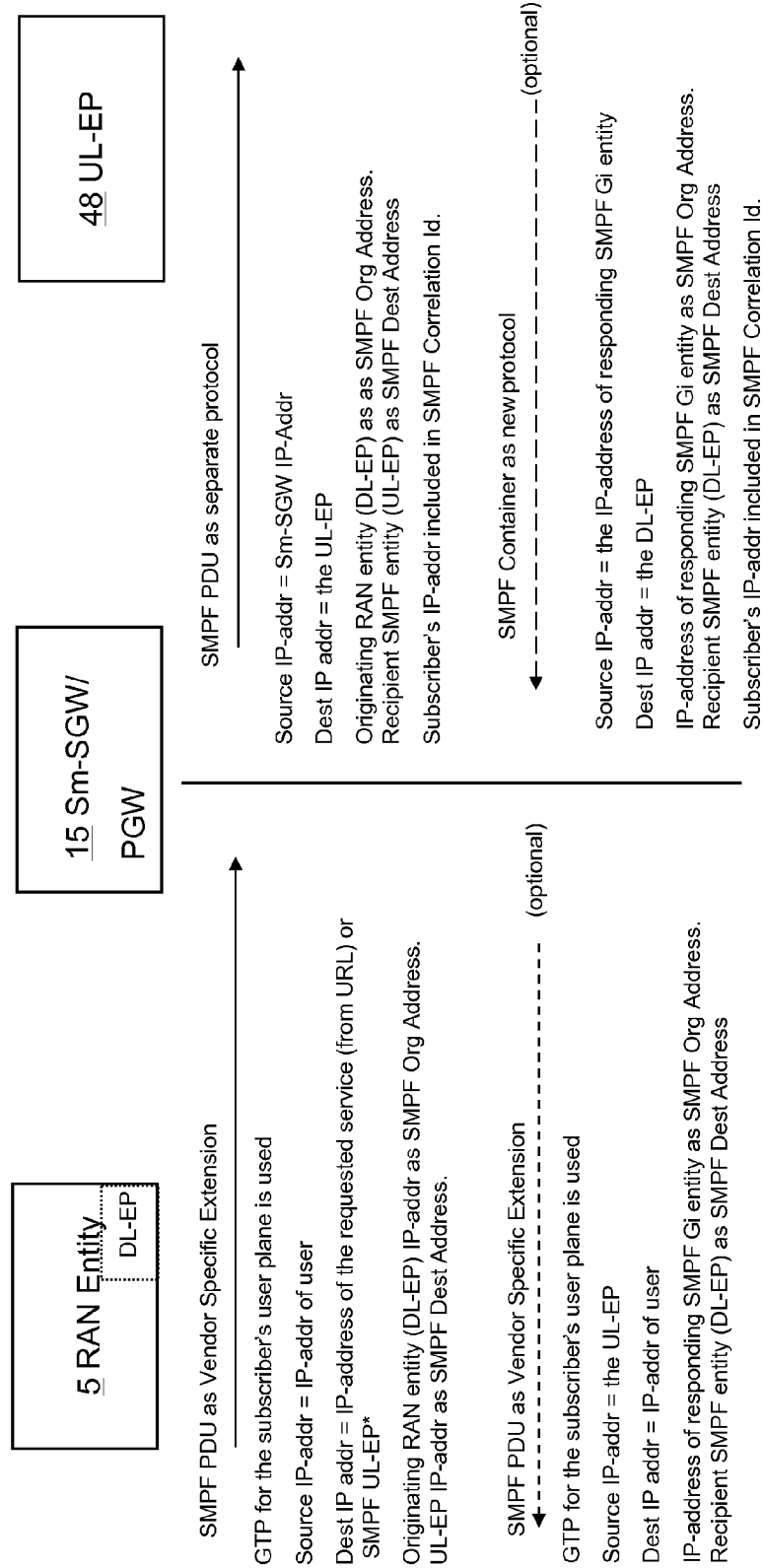
FIG. 16 illustrates addressing and PDU transport mapping where many receiving nodes require Network Aware data.

Addressing of SMPF M2M messages is illustrated in FIG. 16.

Providing a solution for many to many signalling allows delivery of information to many Network Aware applications interested in the same Network Aware data. The information is sent once from the originator to interested parties on the SMPF route, instead of several point-to-point deliveries from the originator to each recipient. This lowers the amount of signalling and enables timely delivery of the information.

The skilled person will appreciate that various modifications may be made to the above described embodiments without departing from the scope of the present invention.

The following abbreviations have been used in this specification:
AP Access Point
DPI Deep Packet Inspection
FBC Flow Based Charging
GPRS General Packet Radio Service
GTP-U GPRS Tunnelling Protocol User Plane
M2M Many to many
MBB Mobile broadband
NAT Network Address Translation
PCC Policy and Charging Control
PCRF Policy Charging and Rules Function
PDN Packet Data Network
PDU Protocol Data Unit
PGW PDN Gateway
QoS Quality of Service
RAN Radio Access Network
RNC Radio Network Controller
SGW Serving Gateway
SMPF Smart Mobile Broadband Protocol Framework
Sm-PGW Smart PDN Gateway
SmS Smart Server
Sm-SGW Smart SGW
PDU Protocol Data Unit
PI Packet Inspection
UE User Equipment
VLAN Virtual Area Network
WCDMA Wideband Code Division Multiple Access

The invention claimed is:

1. A method of sending Network Aware data between a node in a radio network and a node in a service network, the method comprising:
   at a first node, generating a Protocol Data Unit, the Protocol Data Unit comprising Network Aware data; and
   at the first node, sending the Protocol Data Unit inside a General Packet Radio Service Tunnelling Protocol frame, towards a plurality of second nodes that require the Network Aware Data, using a transport bearer,
   wherein the plurality of second nodes requiring the Network Aware Data are determined by an intermediate node in a mobile core network disposed between the radio network and the service network, and
   wherein the first node is in the radio network and the plurality of second nodes are in the service network.

2. The method according to claim 1, further comprising sending the Protocol Data Unit inside User traffic, the User traffic being sent inside the General Packet Radio Service Tunnelling Protocol frame.

3. The method according to claim 1, further comprising sending the Protocol Data Unit in a header extension of the General Packet Radio Service Tunnelling Protocol frame.

4. The method according to claim 1, wherein the first node is in the service network and the plurality of second nodes are in the radio network.

5. The method according to claim 1, further comprising sending the Protocol Data Unit in a message according to a dedicated Network Aware protocol.

6. The method according to claim 1, wherein the Network Aware Data comprises data for informing the plurality of second nodes disposed in the service network about conditions or requirements in the radio network where the first node is disposed.

7. A first node for sending Network Aware data between a second node in a radio network and a third node in a service network, the first node comprising:
   a processor arranged to generate a Protocol Data Unit, the Protocol Data Unit comprising Network Aware data; and
   a transmitter arranged to send the Protocol Data Unit inside a General Packet Radio Service Tunnelling Protocol frame, towards a plurality of fourth nodes that require the Network Aware Data, using a transport bearer,
   wherein the plurality of fourth nodes requiring the Network Aware Data are determined by an intermediate node in a mobile core network disposed between the radio network and the service network, and
   wherein the first node is arranged to be located in the radio network and the plurality of fourth nodes are arranged to be located in the service network.

8. The first node according to claim 7, wherein the transmitter is arranged to send the Protocol Data Unit inside User traffic, the User traffic being sent inside the General Packet Radio Service Tunnelling Protocol frame.

9. The first node according to claim 7, wherein the transmitter is arranged to send the Protocol Data Unit in a header extension of the General Packet Radio Service Tunnelling Protocol frame.

10. The first node according to claim 7, wherein the transmitter is arranged to send the Protocol Data Unit in a message according to a dedicated Network Aware protocol.

11. A gateway node for use in a mobile core network disposed between a radio network and a service network, the gateway node comprising:

a receiver for receiving from a first node a message, the message comprising a Protocol Data Unit, the Protocol Data Unit being carried using a first transport bearer;

a processor for:
   inserting the Protocol Data Unit into a second transport bearer, the second transport bearer being of a different type than the first transport bearer, and
   determining a path for sending the Protocol Data Unit either through a first Packet Data Network Gateway (PGW) or a second PGW based on a determination whether Network Aware Data is comprised in the Protocol Data Unit; and a transmitter for sending the Protocol Data Unit towards one or more second nodes based on the path determined by the processor, wherein the message comprises a General Packet Radio Service Tunnelling Protocol frame, and wherein the first node is in the radio network and the one or more second nodes are in the service network.

12. The gateway node according to claim 11, wherein the Protocol Data Unit is stored in any of a body of the General Packet Radio Service Tunneling Protocol frame and a header extension of the General Packet Radio Service Tunneling Protocol frame.

13. A non-transitory computer-readable medium containing computer executable instructions which, when run in a processor in a first node, causes the first node to:

generate a Protocol Data Unit, the Protocol Data Unit comprising Network Aware data; and send the Protocol Data Unit inside a General Packet Radio Service Tunnelling Protocol frame towards a plurality of second nodes that require the Network Aware Data, using a transport bearer, wherein the plurality of second nodes requiring the Network Aware Data are determined by an intermediate node disposed between the first node and the plurality of second nodes, and wherein the first node is in a radio network and the plurality of second nodes are in a service network.

* * * * *